(12) United States Patent
Rhee et al.

(10) Patent No.: US 7,684,546 B2
(45) Date of Patent: Mar. 23, 2010

(54) DSL SYSTEM ESTIMATION AND CONTROL

(75) Inventors: Wonjong Rhee, Palo Alto, CA (US);
John M. Cioffi, Atherton, CA (US); Bin Lee, Palo Alto, CA (US); Iker Almandoz, Palo Alto, CA (US);
Georgios Ginis, San Francisco, CA (US); C. Thomas Sylke, Whitefish Bay, WI (US)

(73) Assignee: Adaptive Spectrum and Signal Alignment, Inc., Redwood City, CA (US)

( * ) Notice: Subject to any disclaimer, the term of this patent is extended or adjusted under 35 U.S.C. 154(b) by 1091 days.

(21) Appl. No.: 11/342,024

(22) Filed: Jan. 28, 2006

(65) Prior Publication Data

US 2006/0268733 A1 Nov. 30, 2006

Related U.S. Application Data

(60) Provisional application No. 60/679,147, filed on May 9, 2005, provisional application No. 60/698,113, filed on Jul. 10, 2005.

(51) Int. Cl.
*H04M 1/24* (2006.01)
*H04M 3/08* (2006.01)
*H04M 3/22* (2006.01)

(52) U.S. Cl. .................... 379/1.04; 379/1.03; 379/29.09

(58) Field of Classification Search ................ 379/1.01, 379/1.03, 1.04, 15.03, 29.09, 32.01; 375/224, 375/229, 232
See application file for complete search history.

(56) References Cited

U.S. PATENT DOCUMENTS

| | | | |
|---|---|---|---|
| 5,465,321 A | 11/1995 | Smyth et al. | |
| 6,819,746 B1 | 11/2004 | Schneider et al. | |
| 7,272,209 B2 * | 9/2007 | Jiang et al. | 379/1.04 |
| 2003/0086514 A1 | 5/2003 | Ginis et al. | |
| 2004/0095921 A1 | 5/2004 | Kerpez | |
| 2006/0159026 A1 | 7/2006 | Wu et al. | |

FOREIGN PATENT DOCUMENTS

WO    WO 2005/034459 A    4/2005

OTHER PUBLICATIONS

International Search Report, International Application No. PCT/IB2006/001119 (4 pgs), Jul. 28, 2006.
Written Opinion of the International Searching Authority, International Application No. PCT/IB2006/001119 (8 pgs), Jul. 28, 2006.

* cited by examiner

*Primary Examiner*—Quoc D Tran
(74) *Attorney, Agent, or Firm*—Blakely, Sokoloff, Taylor & Zafman LLP

(57) ABSTRACT

Methods, apparatus, computer program products and other embodiments model a system's channel and noise characteristics using one or more Hidden Markov Models (HMMs) by modeling the state dynamics for one or more lines and associated profiles and by learning from the line history. Besides channel and noise characteristics, user data activity also can be modeled using an HMM, where all channel, noise and user data activity can be modeled jointly using HMMs as long as the joint states are properly defined. In multi-line systems, multiple lines (for example, a set of lines in a DSL system binder) may be modeled jointly. After learning channel, noise, user data activity and/or other dynamics using HMM techniques and methods, system operation and/or configuration parameters can be controlled based on the estimated HMM, providing flexible solutions for virtually any channel, noise, user data activity and/or other dynamics.

22 Claims, 9 Drawing Sheets

DSL SYSTEM ESTIMATION AND CONTROL

CROSS-REFERENCE TO RELATED APPLICATIONS

This application claims the benefit under 35 U.S.C. § 119 (e) of the following:

U.S. Provisional Application No. 60/679,147 filed on May 09, 2005, entitled STATE ESTIMATION AND ADAPTIVE SYSTEM CONFIGURATION, the entire disclosure of which is incorporated herein by reference in its entirety for all purposes.

U.S. Provisional Application No. 60/698,113 filed on Jul. 10, 2005, entitled DSL SYSTEM, the entire disclosure of which is incorporated herein by reference in its entirety for all purposes.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISK APPENDIX

Not applicable.

BACKGROUND

1. Technical Field

This invention relates generally to methods, systems and apparatus for managing digital data transmission and/or communication systems.

2. Description of Related Art

Digital subscriber line (DSL) technologies provide potentially large bandwidth for digital communication over existing telephone subscriber lines (referred to as loops and/or the copper plant). In particular, DSL systems can adjust to the characteristics of the subscriber line by using a discrete multitone (DMT) line code that assigns a number of bits to each tone (or sub-carrier), which can be adjusted to channel conditions as determined during training and initialization of the modems (typically transceivers that function as both transmitters and receivers) at each end of the subscriber line.

DSL systems operate over a dynamic transmission environment with effects that may have time-varying characteristics and that can have a severe impact on reliable communication. Such effects include impulse noise, strong crosstalk disturbers and electrical faults such as bridged taps, bad splices, and bridged taps. Additionally, DSL system communication typically is also dynamic, because actual user traffic depends heavily on the user activity. DSL management systems have to cope with these dynamic effects and have to compensate therefor when controlling of DSL system operation. Such DSL management systems would benefit significantly from having knowledge of the current "state" of the DSL system, where state refers to any of the dynamic effects mentioned above.

Systems, apparatus, methods and techniques that provide improvements for controlling and/or managing DSL systems using state information about the DSL system would represent a significant advancement in the art.

BRIEF SUMMARY

The present invention models the state dynamics for a line and associated profiles by learning from the line history (as opposed to using fixed state machines, with possibly variable thresholds for moving)—that is "what is the state machine." Embodiments of the present invention implement methods, apparatus, computer program products and other embodiments for modeling a communication or other data transmission system's channel and its noise characteristics (including both non-impulsive noise and impulsive noise) using one or more Hidden Markov Models (HMMs). Besides channel and noise characteristics, user data activity also can be modeled using an HMM. Further, all channel, noise and user data activity can be modeled jointly using HMMs as long as the joint states are properly defined. In some embodiments of this invention, multiple lines (for example, a set of DSL lines in a DSL system binder) may be jointly modeled.

Embodiments of the present invention learn channel, noise, user data activity and/or other dynamics using HMM techniques and methods and thereafter control system operation and/or configuration parameters based on the estimated HMM. In contrast to traditional static communication line/system operation and/or control approaches (static in the sense that existing and changing channel, noise, user data activity and/or other characteristics are not reflected in system control and/or configuration), which typically are not flexible enough to cope with various environments observed in communication systems, embodiments of the present invention provide flexible solutions for virtually any channel, noise, user data activity and/or other dynamics. Illustrative examples are presented herein for xDSL systems. However, the invention applies to any communication or other data transmission system in which HMM modeling can be applied as taught herein.

Further details and advantages of the invention are provided in the following Detailed Description and the associated Figures.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

Figure 1:
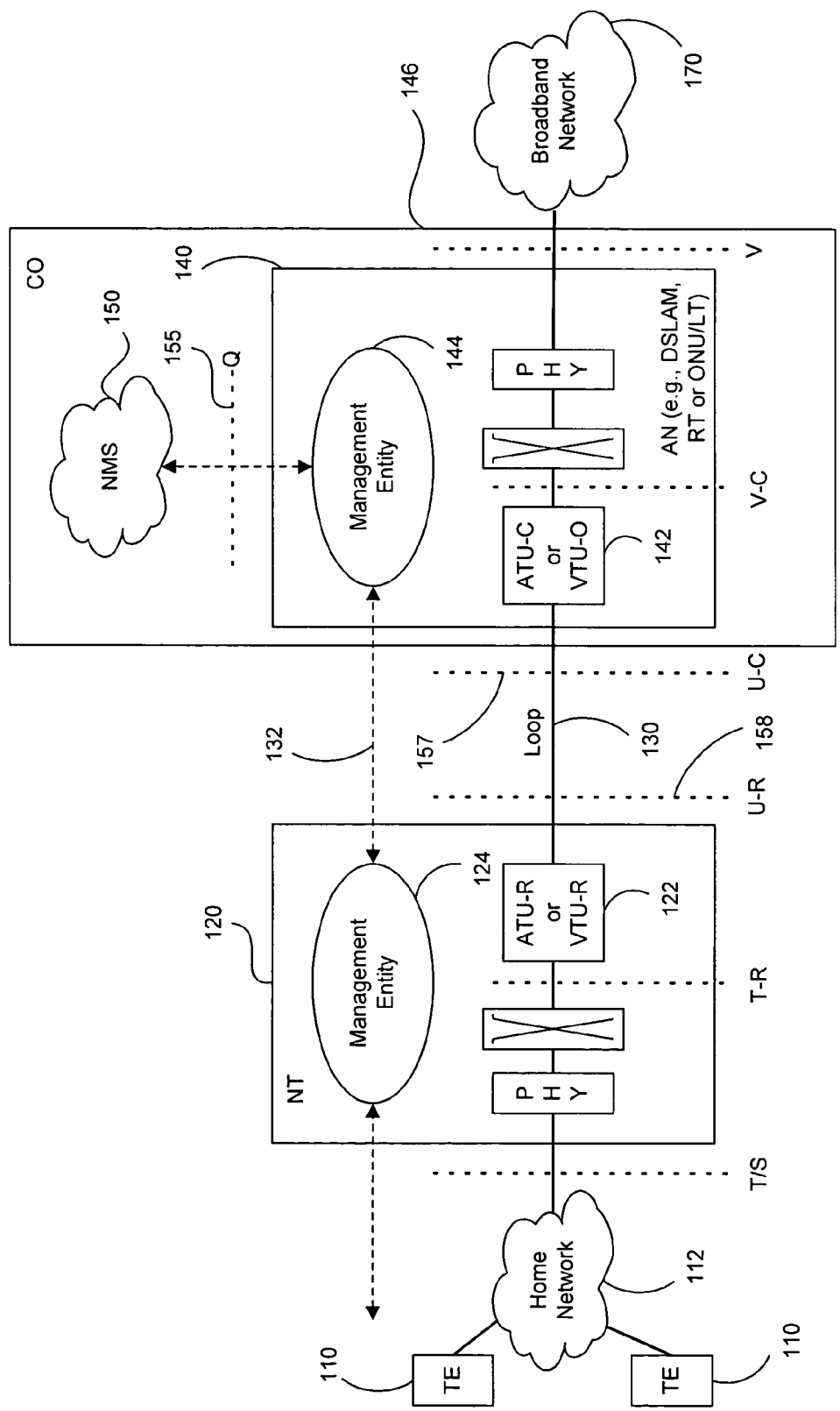
FIG. 1 is a schematic block reference model system per the G.997.1 standard applicable to DSL and other systems in which embodiments of the present invention may be used.

The following detailed description of the invention will refer to one or more embodiments of the invention, but is not limited to such embodiments. Rather, the detailed description is intended only to be illustrative. Those skilled in the art will readily appreciate that the detailed description given herein with respect to the Figures is provided for explanatory purposes as the invention extends beyond these limited embodiments.

A controller, such as a DSL optimizer, dynamic spectrum management center (DSM Center), a "smart" modem and/or computer system can be used to collect and analyze the operational data and/or performance parameter values as described in connection with the various embodiments of the present invention. The controller and/or other components can be a computer-implemented device or combination of devices. In some embodiments, the controller is in a location remote from modems or other communication equipment coupled to a communication line. In other cases, the controller may be collocated with one of or both of the "local" devices (that is, devices directly coupled to a communication line or part of such a local device) as equipment directly connected to a modem, DSLAM or other communication system device, thus creating a "smart" modem. In addition, as will be appreciated by those skilled in the art, the controller may be coupled to any other type of data transmission system in which the present invention would be useful. The phrases "coupled to" and "connected to" and the like are used herein to describe a connection between two elements and/or components and are intended to mean coupled either directly together, or indirectly, for example via one or more intervening elements or via a wireless connection, where appropriate. Moreover, references to a "communication system" also are intended, where applicable, to include reference to any other type of data transmission system.

Some of the following examples of embodiments of the present invention will be used in connection with one-sided or two-sided vectored ADSL and/or VDSL systems as exemplary data transmission systems. Within these DSL systems, certain conventions, rules, protocols, etc. may be used to describe operation of the exemplary DSL system and the information and/or data available from customers (also referred to as "users") and/or equipment on the system. However, as will be appreciated by those skilled in the art, embodiments of the present invention may be applied to various types of data transmission systems, and the invention thus is not limited to any particular system.

Various network-management elements are used for management of ADSL and VDSL physical-layer resources, where elements refer to parameters or functions within an ADSL or VDSL modem pair, either collectively or at an individual end. A network-management framework consists of one or more managed nodes, each containing an agent. The managed node could be a router, bridge, switch, modem or other. At least one NMS (Network Management System), which is often called the manager, monitors and controls managed nodes and is usually based on a common PC or other computer. NMS is in some instances also referred to as an Element Management System (EMS). A network management protocol is used by the manager and agents to exchange management information and data. The unit of management information is an object. A collection of related objects is defined as a Management Information Base (MIB).

FIG. 1 shows the reference model system according to the G.997.1 standard (G.ploam), which applies to various ADSL and VDSL systems, which is well known to those skilled in the art, and in which embodiments of the present invention can be implemented. This model applies to ADSL and VDSL systems meeting the various standards that may or may not include splitters, such as ADSL1 (G.992.1), ADSL-Lite (G.992.2), ADSL2 (G.992.3), ADSL2-Lite (G.992.4), ADSL2+(G.992.5), VDSL1 (G.993.1) and other G.993.x emerging VDSL standards, as well as the G.991.1 and G.991.2 SHDSL standards, all with and without bonding. These standards, variations thereto, and their use in connection with the G.997.1 standard are all well known to those skilled in the art.

The G.997.1 standard specifies the physical layer management for ADSL and VDSL transmission systems based on the clear embedded operation channel (EOC) defined in G.997.1 and use of indicator bits and EOC messages defined in G.99x standards. Moreover, G.997.1 specifies network management elements content for configuration, fault and performance management. In performing these functions, the system utilizes a variety of operational data that are available at and can be collected from an access node (AN). The DSL Forum's TR69 report also lists the MIB and how it might be accessed. In FIG. 1, customers' terminal equipment 110 is coupled to a home network 112, which in turn is coupled to a network termination unit (NT) 120. In the case of an ADSL system, NT 120 includes an ATU-R 122 (for example, a modem, also referred to as a transceiver in some cases, defined by one of the ADSL and/or VDSL standards) or any other suitable network termination modem, transceiver or other communication unit. The remote device in a VDSL system would be a VTU-R. As will be appreciated by those skilled in the art and as described herein, each modem interacts with the communication system to which it is connected and may generate operational data as a result of the modem's performance in the communication system.

NT 120 also includes a management entity (ME) 124. ME 124 can be any suitable hardware device, such as a microprocessor, microcontroller, or circuit state machine in firmware or hardware, capable of performing as required by any applicable standards and/or other criteria. ME 124 collects and stores performance data in its MIB, which is a database of information maintained by each ME, and which can be accessed via network management protocols such as SNMP (Simple Network Management Protocol), an administration protocol used to gather information from a network device to provide to an administrator console/program or via TL1 commands, TL1 being a long-established command language used to program responses and commands between telecommunication network elements.

Each ATU-R in a system is coupled to an ATU-C in a CO or other upstream and/or central location. In a VDSL system, each VTU-R in a system is coupled to a VTU-O in a CO or other upstream and/or central location (for example, any line termination device such as an ONU/LT, DSLAM, RT, etc.). In FIG. 1, ATU-C 142 is located at an access node (AN) 140 in a CO 146. AN 140 may be a DSL system component, such as a DSLAM, ONU/LT, RT or the like, as will be appreciated by those skilled in the art. An ME 144 likewise maintains an MIB of performance data pertaining to ATU-C 142. The AN 140 may be coupled to a broadband network 170 or other network, as will be appreciated by those skilled in the art. ATU-R 122 and ATU-C 142 are coupled together by a loop 130, which in the case of ADSL (and VDSL) typically is a telephone twisted pair that also carries other communication and/or data transmission services.

Several of the interfaces shown in FIG. 1 can be used for determining and collecting operational and/or performance data. To the extent the interfaces in FIG. 1 differ from another ADSL and/or VDSL system interface scheme, the systems are well known and the differences are known and apparent to those skilled in the art. The Q-interface 155 provides the interface between the NMS 150 of the operator and ME 144 in AN 140. All the parameters specified in the G.997.1 standard apply at the Q-interface 155. The near-end parameters supported in ME 144 are derived from ATU-C 142, while the far-end parameters from ATU-R 122 can be derived by either of two interfaces over the U-interface. Indicator bits and EOC messages, which are sent using embedded channel 132 and are provided at the PMD layer, can be used to generate the required ATU-R 122 parameters in ME 144. Alternately, the OAM (Operations, Administrations and Management) channel and a suitable protocol can be used to retrieve the parameters from ATU-R 122 when requested by ME 144. Similarly, the far-end parameters from ATU-C 142 can be derived by either of two interfaces over the U-interface. Indicator bits and EOC messages, which are provided at the PMD layer, can be used to generate the required ATU-C 142 parameters in ME 124 of NT 120. Alternately, the OAM channel and a suitable protocol can be used to retrieve the parameters from ATU-C 142 when requested by ME 124.

At the U-interface (which is essentially loop 130), there are two management interfaces, one at ATU-C 142 (the U-C interface 157) and one at ATU-R 122 (the U-R interface 158). Interface 157 provides ATU-C near-end parameters for ATU-R 122 to retrieve over the U-interface 130. Similarly, interface 158 provides ATU-R near-end parameters for ATU-C 142 to retrieve over the U-interface 130. The parameters that apply may be dependent upon the transceiver standard being used (for example, G.992.1 or G.992.2).

The G.997.1 standard specifies an optional OAM communication channel across the U-interface. If this channel is implemented, ATU-C and ATU-R pairs may use it for transporting physical layer OAM messages. Thus, the transceivers 122, 142 of such a system share various operational and performance data maintained in their respective MIBs.

More information can be found regarding ADSL NMSs in DSL Forum Technical Report TR-005, entitled "ADSL Network Element Management" from the ADSL Forum, dated March 1998. Also, DSL Forum Technical Report TR-069, entitled "CPE WAN Management Protocol" from the DSL Forum, dated May 2004. Finally, DSL Forum Technical Report TR-064, entitled "LAN-Side DSL CPE Configuration Specification" from the DSL Forum, dated May 2004. These documents address different situations for CPE side management and the information therein is well known to those skilled in the art. More information about VDSL can be found in the ITU standard G.993.1 (sometimes called "VDSL1") and the emerging ITU standard G.993.2 (sometimes called "VDSL2"), as well as several DSL Forum working texts in progress, all of which are known to those skilled in the art. For example, additional information is available in the DSL Forum's Technical Report TR-057 (Formerly WT-068v5), entitled "VDSL Network Element Management" (February 2003) and Technical Report TR-065, entitled "FS-VDSL EMS to NMS Interface Functional Requirements" (March 2004) as well as in the emerging revision of ITU standard G.997.1 for VDSL1 and VDSL2 MIB elements, or in the ATIS North American Draft Dynamic Spectrum Management Report, NIPP-NAI-2005-031.

It is less common for lines sharing the same binder to terminate on the same line card in ADSL, than it is in VDSL. However, the discussion of xDSL systems may be extended to ADSL, also, because common termination of same-binder lines might also be done (especially in a newer DSLAM that handles both ADSL and VDSL). In a typical topology of a DSL plant, in which a number of transceiver pairs are operating and/or available, part of each subscriber loop is collocated with the loops of other users within a multi-pair binder (or bundle). After the pedestal, very close to the Customer Premises Equipment (CPE), the loop takes the form of a drop wire and exits the bundle. Therefore, the subscriber loop traverses two different environments. Part of the loop may be located inside a binder, where the loop is sometimes shielded from external electromagnetic interference, but is subject to crosstalk. After the pedestal, the drop wire is often unaffected by crosstalk when this pair is far from other pairs for most of the drop, but transmission can also be more significantly impaired by electromagnetic interference because the drop wires are unshielded. Many drops have 2 to 8 twisted-pairs within them and in situations of multiple services to a home or bonding (multiplexing and demultiplexing of a single service) of those lines, additional substantial crosstalk can occur between these lines in the drop segment.

Figure 2:
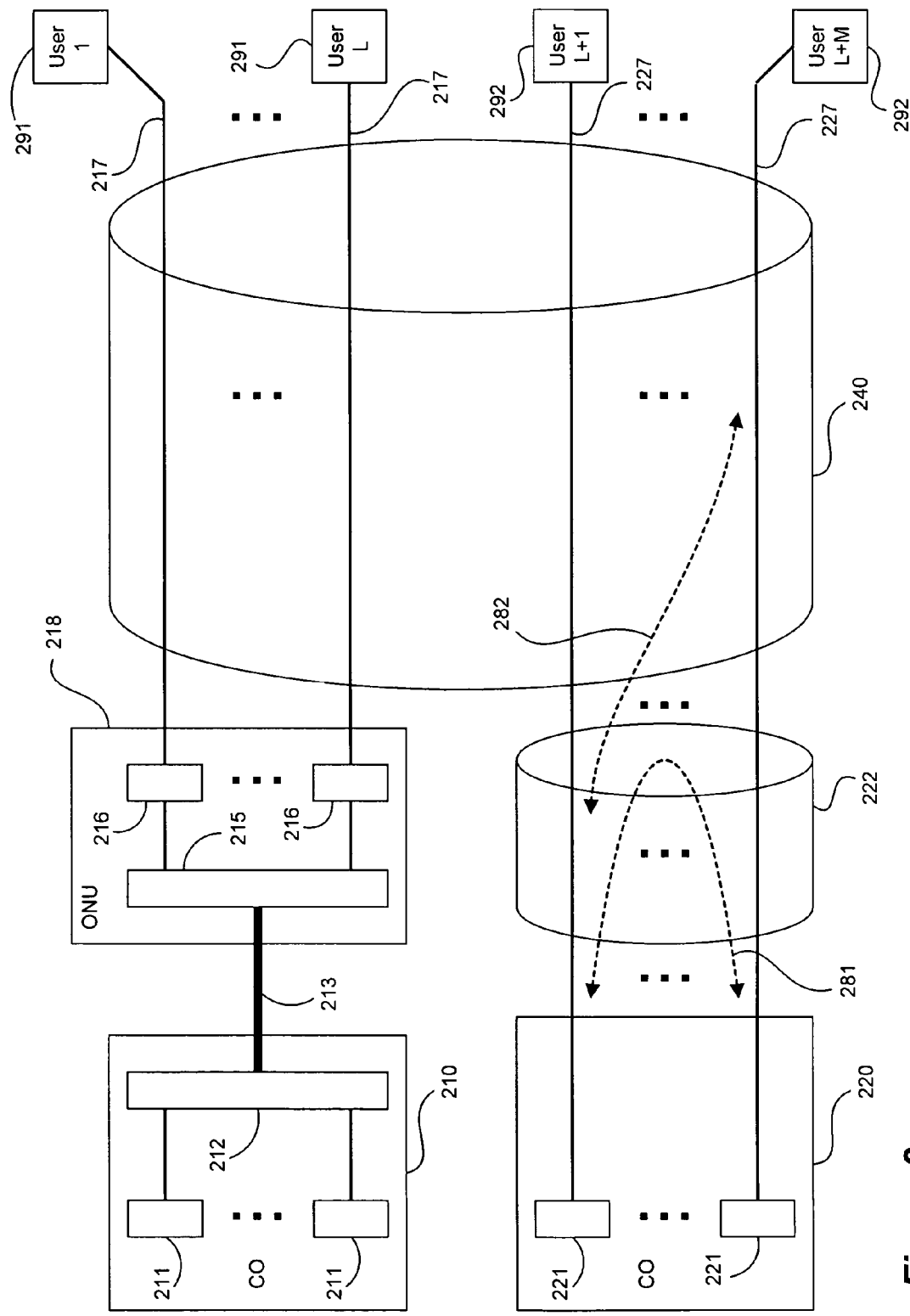
FIG. 2 is a schematic diagram illustrating generic, exemplary DSL deployment.

A generic, exemplary DSL deployment scenario is shown in FIG. 2. All the subscriber loops of a total of (L+M) users 291, 292 pass through at least one common binder. Each user is connected to a Central Office (CO) 210, 220 through a dedicated line. However, each subscriber loop may be passing through different environments and mediums. In FIG. 2, L customers or users 291 are connected to CO 210 using a combination of optical fiber 213 and twisted copper pairs 217, which is commonly referred to as Fiber to the Cabinet (FTT-Cab) or Fiber to the Curb. Signals from transceivers 211 in CO 210 have their signals converted by optical line terminal 212 and optical network terminal 215 in CO 210 and optical network unit (ONU) 218. Modems 216 in ONU 218 act as transceivers for signals between the ONU 218 and users 291.

Users' lines that co-terminate in locations such as COs 210, 218 and ONU 220 (as well as others) may be operated in a coordinated fashion, such as vectoring. In vectored communication systems (such as vectored ADSL and/or VDSL systems), coordination of signals and processing can be achieved. Downstream vectoring occurs when multiple lines' transmit signals from a DSLAM or LT are co-generated with a common clock and processor. In VDSL systems with such a common clock, the crosstalk between users occurs separately for each tone. Thus each of the downstream tones for many users can be independently generated by a common vector transmitter. Similarly, upstream vectoring occurs when a common clock and processor are used to co-receive multiple lines' signals. In VDSL systems with such a common clock, the crosstalk between users occurs separately for each tone. Thus each of the upstream tones for many users can be independently processed by a common vector receiver.

The loops 227 of the remaining M users 292 are copper twisted pairs only, a scenario referred to as Fiber to the Exchange (FTTEx). Whenever possible and economically feasible, FTTCab is preferable to FTTEx, since this reduces the length of the copper part of the subscriber loop, and consequently increases the achievable rates. The existence of FTTCab loops can create problems to FTTEx loops. Moreover, FTTCab is expected to become an increasingly popular topology in the future. This type of topology can lead to substantial crosstalk interference and may mean that the lines of the various users have different data carrying and performance capabilities due to the specific environment in which they operate. The topology can be such that fiber-fed "cabinet" lines and exchange lines can be mixed in the same binder.

As can be seen in FIG. 2, the lines from CO 220 to users 292 share binder 222, which is not used by the lines between CO 210 and users 291. Moreover, another binder 240 is common to all the lines to/from CO 210 and CO 220 and their respective users 291, 292. In FIG. 2, far end crosstalk (FEXT) 282 and near end crosstalk (NEXT) 281 are illustrated as affecting at least two of the lines 227 collocated at CO 220.

As will be appreciated by those skilled in the art, at least some of the operational data and/or parameters described in these documents can be used in connection with embodiments of the present invention. Moreover, at least some of the system descriptions are likewise applicable to embodiments of the present invention. Various types of operational data and/or information available from a DSL NMS can be found therein; others may be known to those skilled in the art.

It is desirable with some embodiments of the present invention that the lines within a binder terminate on a single line card (on which a vectored DSL chip or device sits or to which such a device is otherwise coupled). There is no guarantee, however, in normal wiring practice that such single-line-card common-binder termination occurs. If it does, crosstalk can be cancelled/exploited with vectoring. The routing of signals can also occur in electronic distribution frames or backplanes, though they can add cost to the overall system. In this way, the line termination ("LT") of VDSL, typically terminating 48, 96 or 192 lines in a neighborhood or building on one or a few line cards, has a relatively good chance of terminating all the lines from a binder on a line card, especially if the telephone company does some work in wiring to ensure such common-card termination.

In general, Hidden Markov Models (HMMs) are stochastic signal models that use definable parameters to model complex behaviors. HMMs use a number of internal or hidden states and a defined state sequence described by state transition probabilities to model complex behaviors. The systems use outputs that are distinct from the internal states. The output, called an observable symbol, can be a scalar value representing a single output and/or output type to the HMM, or a vector quantity representing multiple outputs and/or output types. The observable symbols are used to model the HMM, as well as to generate probabilities that represent how well the HMM matches the measured data.

More specifically, a given system (such as a DSL system or other, similar communication and/or data transmission system) typically has a number of internal states that are not directly observable. Examples of such internal (or hidden) states might include and/or be based on data traffic, crosstalk presence, impulse noise state, phone on-hook/off-hook, bad splice presence, etc. These hidden states may generally be any effect on the DSL line that can change over time and which is not directly observable by a management system or the like. HMMs implemented according to embodiments of the present invention assist in determining, among other things, the current state, the next state to which the system might transition, and the probability that the system is in a given state when one or more observable symbols of the system are known.

Mathematically, an HMM can be described as follows:

N: the number of hidden states.

M: the number of observable scalar or vector symbols.

A: the state-transition probability matrix of state j moving to state i in the next time period, where $a_{ij}=Pr(n_{t+1}=i|n_t=j)$, $1 \leq i, j \leq N$, and where t is the time period index and $n_t$ is the state number during time period t.

B: the observation probability distribution vector of observing symbol k while the state is j where $B_j(k)=Pr(o_t=k|n_t=j)$, $1 \leq k \leq M$, $1 \leq j \leq N$ and $o_t$ is the observed symbol during time period t.

π: the initial state distribution, $\pi_j=Pr(n_1=j)$, $1 \leq j \leq N$.

λ: the entire HMM model $\lambda=(A, B, \pi)$.

Note that one of the M symbols is observed in each time period, but the state needs to be estimated based on the observation because it is not directly observable.

In the state estimation and adaptive-configuration system of the present invention, one or more HMMs are used to estimate one or more internal states of a communication system. These states might represent states such as whether a given communication line is in use and, in some cases, what kind of use is being made of the line. In some cases, each state may be a single performance condition (for example, when impulse noise is above a given threshold), while the output relied upon may be a single operating or performance parameter value or distribution, or an operating or performance condition (for example, high code violation counts in a DSL system), or a combination of parameters and/or performance characteristics.

The HMM is selected based on the type(s) of information available from the subject communication system. In the case of DSL systems, there are a number of parameters and/or data available from a system MIB and/or other components of the system, as noted above and below in this disclosure. Moreover, a controller such as a DSL optimizer can collect other operational data from the system via other means, as discussed in more detail herein.

Embodiments of the present invention use an HMM to assist in estimating the configuration and/or use of the data transmission system and, in some embodiments, to configure and/or control operation of the data transmission system, for example to improve performance or to provide specific services to various users of the system.

Various examples of embodiments of the present invention are presented herein in connection with xDSL systems. However, as will be appreciated by those skilled in the art, the invention applies more generally to any communication and/or other data transmission system in which the methods, apparatus and other embodiments of the present invention can be applied. For example, embodiments of the present invention can be implemented in any communication system where multiple frequency bands or subcarriers may be used by each user (such as OFDM (Orthogonal Frequency Division Multiplex) in wireless systems or DMT (Discrete Multi-Tone) in xDSL systems) while significant interference (commonly called crosstalk in xDSL) exists among and/or is caused by the users in the system. In an xDSL system, a line might experience time varying changes in a given performance parameter (that is, output), such as code violations (CV) counts, as a result of transitions between impulse noise states. In most situations, a CV distribution does not change for a given impulse noise state. That impulse noise state usually is fixed by the status of one or more electronic devices being in either an "on" state or an "off" state inside or near a customer's premises from which the DSL line operates. A simplified use of an HMM could model impulses by on and off states for electronics using an HMM. The present invention also can use these simplified models and extend them to use of HMMs based on multiple observable DSL parameters, such as data activity, various conditions of impulse noise, crosstalk, etc., for defining each state and then using the estimated HMM model and estimated current state for controlling operation parameters such as data rate, FEC setting (for example, delay and INP), TSNRM, MAXSNRM, PSDMASK, CARMASK, and/or BCAP.

As noted above, and in contrast to fixed-state-machines or Markov Models (MMs), the states of an HMM are not directly observable, but instead are determined based on the probabilities of such states based on observed outputs of the communication system. The Baum-Welch algorithm (also known as Backward-Forward Dynamic Programming) can be used to analyze the observed performance parameter data (for example, CV counts) to construct the HMM. The Baum- Welch algorithm finds HMM parameters with the maximum likelihood of generating a given symbol sequence present in an observation vector, as will be appreciated by those skilled in the art.

Embodiments of the present invention also apply HMM techniques, such as those usable with CV count distributions, forward error correction (FEC) counts, noise margin, maximum-attainable data rate, noise spectrum and/or SNR and other operational data that are available from xDSL systems. Besides these types of performance metrics, the present invention applies the HMM to user data activity, where data such as asynchronous transfer mode (ATM) cell counts, Ethernet packet counts and/or IP packet counts can be used as the observed data, and further wherein states that can be defined by or in terms of user activity can be used as the hidden states. For example, some of these hidden states might be defined as "user browsing web pages," "user downloading large files," "user frequently downloading small files," "user using Voice over IP service," or "user not using data service." As will be appreciated by those skilled in the art, other hidden states can be formulated and utilized in connection with various embodiments of the present invention.

The hidden states can be estimated independently or jointly for the data fields using the Baum-Welch algorithm. Then, the estimated HMM can be used to control or configure system parameters such as data rate, FEC coding parameters, etc. to achieve desired performance and/or operational goals.

Figure 3:
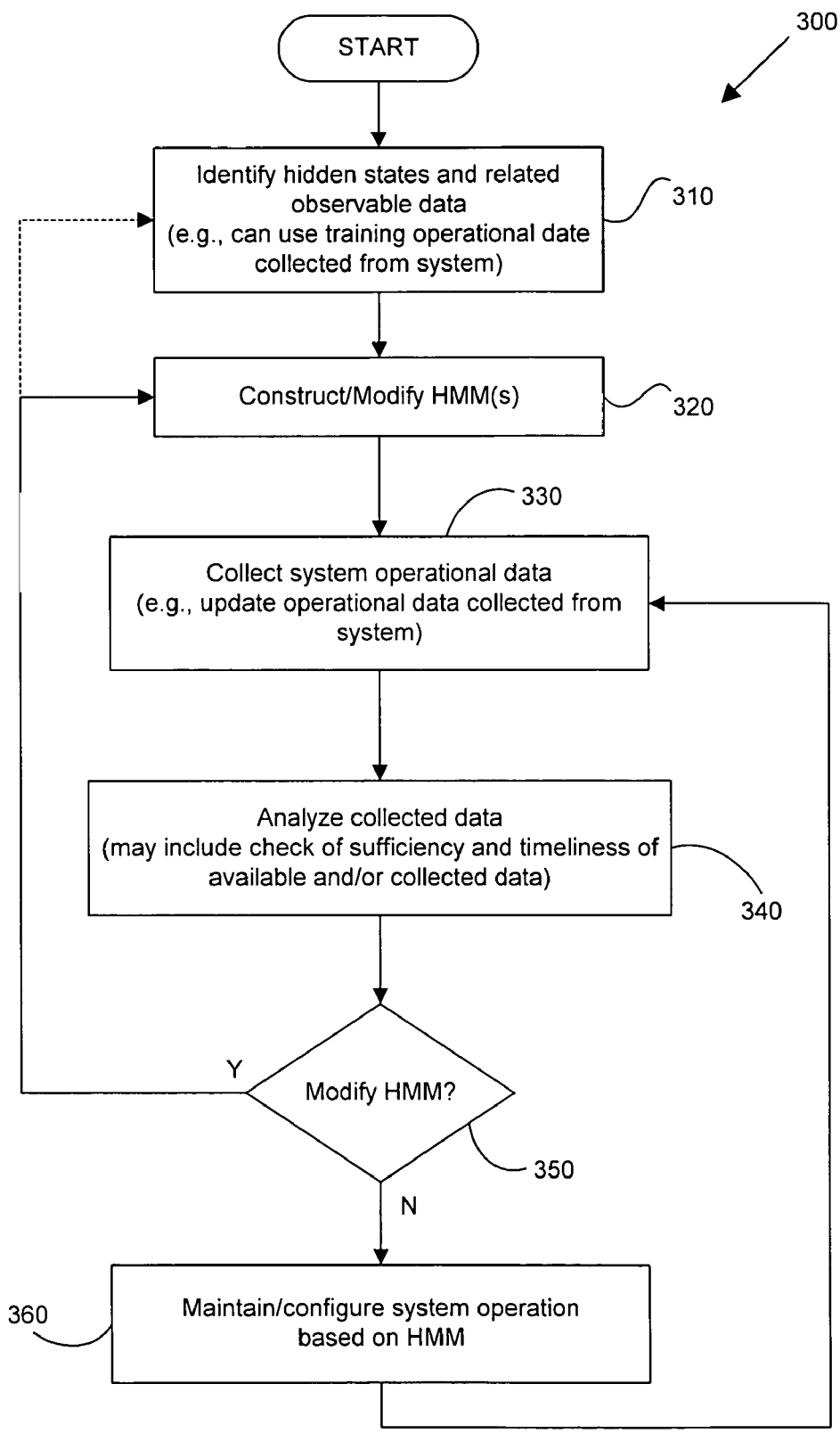
FIG. 3 is a diagram of a method per one embodiment of the present invention.

One method according to the present invention is shown in FIG. 3. The method uses various hidden states and observable data (for example, outputs and/or states). At 310 hidden (internal) states and observable data related to those states are identified. This can be done by collecting and analyzing training operational data obtained from a DSL system operational data source or the like, as will be appreciated by those skilled in the art. At 320 an HMM is constructed, for example using the identified hidden states, an initial state distribution and a state-transition probability matrix. Update operational data is then collected from the communication system at 330 and thereafter analyzed at 340. At decision 350 the HMM is evaluated to determine whether it should be updated or otherwise modified. Modification may be desirable due to new data that has been collected, due to the absence of sufficient and/or timely operational data and for other reasons that will be apparent to those skilled in the art. If the HMM requires modification, that can be done at 310, where one or more of the underlying structural components of the HMM may be addressed (for example, the number or nature of the hidden states and/or observable symbols), followed by an update of the HMM at 320. Alternatively, if the HMM requires modification, that can be done at 320, without changing the underlying structural components of the HMM.

In some embodiments, step 310 may be a major change, while 320 might be a relatively minor change. At 320, the changes can be drastic, and could include changing the number of states itself (for example, originally setting 2 states "crosstalk" and "no crosstalk"—then receiving more data and creating 3 states "crosstalk A," "crosstalk B,"and "no crosstalk"). At 320, one might only reassess the model, and perhaps update some of the parameters (for example, the probability of "crosstalk" changes after receiving more data).

If the HMM does not require modification at 350, then the communication system can be configured at 360 (or maintained in a then-present configuration), based on the HMM. This configuration may include setting operational parameters, controlling operation, etc. A DSL line's operation and/or system operation can be configured and/or ordered to operate in a specified manner to reflect the information available from the HMM constructed from the collected data. After configuring the system based on the HMM, more operational data can be collected at 330. The collection, analysis, HMM construction and configuration can be performed by a controller such as DSL optimizer, if desired, and be implemented in an xDSL system. Moreover, these methodologies can be implemented in software and/or other computer program products, as will be appreciated by those skilled in the art.

The evaluation of whether a line and/or system should be configured, maintained or altered and/or any other evaluation of operational data according to embodiments of the present invention may be required to be based on the most recently available operational data pertaining to the operational condition or may be based on historical data as well as the current data. For example, if a noise source (for example, an appliance or other device) that has caused performance problems in the past is removed (for example, thrown away by a resident), its prior influence on the structure of an HMM and/or implementation of rules pertaining to noise from the source should be removed or at least reduced. Therefore, if historical data is used, it may be weighted in any suitable manner. For example, a data weighting vector (W) can be given to each line and/or operational condition so that the weighting of current and historical data can be applied as a function of how current the data is. For instance, if the weighting vector is $W1=[1\ 1\ 1]$, then the data from the last three update periods (for example, days) are given equal weight in evaluating compliance. If the weighting vector is $W2=[1\ 0\ 0\ 0\ 0\ 0\ 0\ 0.5]$, then the data from the last reported operational condition data is used with weighting 1 and data from 7 update periods earlier (for example, one week ago) is used with weighting 0.5. Data from other update periods are ignored. If it is desired to use data from only the last 2 months with equal weighting, then the weighting vector can be of size 60 with all ones (that is, $W3=[1\ 1\ 1\ \ldots\ 1\ 1\ 1]$), using an update period of one day. Different weighting vectors can be used for different operational conditions, for example depending on whether a single reading should serve as the basis for any decision and/or change to an HMM.

In addition to the timeliness of the operational data considered, the evaluation of whether any decision should be made and/or action taken, and/or any other evaluation of operational data, may be required to be based on a sufficient quantity of available operational data. For example, in some cases, the data collection system might malfunction or be inactive, meaning that too little or no data might be available. In such cases, it might be helpful for the system to abstain from making any changes to a system and/or line operation, or any limits and/or parameters applicable thereto, when there is insufficient data on which to base reliable evaluation. To prevent an inappropriate changes from being implemented, implementation of a change can be limited only to those cases when sufficient additional data has been collected since the last evaluation or within a specified time period. Operational data may be viewed using cardinality techniques and data probability distributions. Sophisticated distribution estimation might be used to reduce the influence of distant past values in favor of more recently collected data and are well understood by those skilled in the art. If a data sufficiency or timeliness rule is not satisfied, then no action may be taken until new data is collected that allows such a rule to be met.

Several examples likewise illustrate embodiments of the present invention.

EXAMPLE 1

A DSL line has 8 hidden states (N=8), as defined in the following Table 1:

TABLE 1

8 states of a DSL line in Example 1.

| State number | Data activity | Impulse noise | Crosstalk |
|---|---|---|---|
| 1 | Off | Off | Off |
| 2 | Off | Off | On |
| 3 | Off | On | Off |
| 4 | Off | On | On |
| 5 | On | Off | Off |
| 6 | On | Off | On |
| 7 | On | On | Off |
| 8 | On | On | On |

In Table 1, the designations "on" and "off" may indicate absolute on and off states or may represent activity above and/or below a given threshold value.

For each state, an observation probability distribution can be defined for vector symbols consisting of upstream and/or downstream ATM cell counts/Ethernet packet counts/IP packet counts, code violations plus FEC counts and average noise level. Some other observable parameters such as data rate, noise margin, retrain counts and/or peak to average ratio of noise power may be used as part of one or more observation vector symbols if they provide any information on one or more hidden states. To reduce the number of observable symbols M, ranges can be used instead of the raw observation values (for example, CV+FEC can be modeled using only the following 4 observations:

$CV+FEC \leq 50$ $51 \leq CV+FEC \leq 100$ $101 \leq CV+FEC \leq 1000$ $1000 \leq CV+FEC.$ With a sufficiently long sequence of observations, where each observation consists of a set of parameters like those described above, observation probability distribution B, state-transition probability matrix A, and the initial state distribution π can be estimated based on the Baum-Welch algorithm. After identifying the best estimate of the HMM, $\lambda=(A, B, \pi)$, the current state can be estimated using the well known Viterbi algorithm.

A controller, such as DSL optimizer or DSM center, may then set control parameters of the line based on $\lambda=(A, B, \pi)$. Because there is no data activity for states 1-4 in Example 1, the controller may decide to ignore those 4 states for determining control parameters. For instance, if the probability of state 7 or state 8 occurring is very low, then the controller might set FEC protection to a minimal level, even if the probability of state 3 or state 4 is high. This illustrative case is explained in more detail in connection with Example 2, below.

Also, the controller may use the current state information. For example, if the current state is 6 or 8, the rate target might be set at a low value, $R_{low}$, so that the DSL line can continue reliable communication despite crosstalk effects. If the current state is neither 6 nor 8, the rate target might be set at a high value, $R_{high}$, because there is no material crosstalk for the states of interest. For ADSL1 or VDSL1, a rate change requires retraining a modem, and thus interrupting data service (typically for 20-40 seconds), which might not be desirable. An alternative way to address this situation is considered in connection with illustrative Example 4. For ADSL2 and VDSL2, a rate change can be done without retraining (via Seamless Rate Adaptation), and thus the current state information may be used directly for deciding data rates. Also, power management transitions can be directly controlled as a function of a current HMM state.

Besides FEC parameters (for example, delay and INP) and data rates, TSNRM, MAXSNRM, MINSNRM, CARMASK, PSDMASK, transmit power, BCAP, etc. may be adaptively set as functions of λ and the current state estimate.

EXAMPLE 2

Figure 5A:
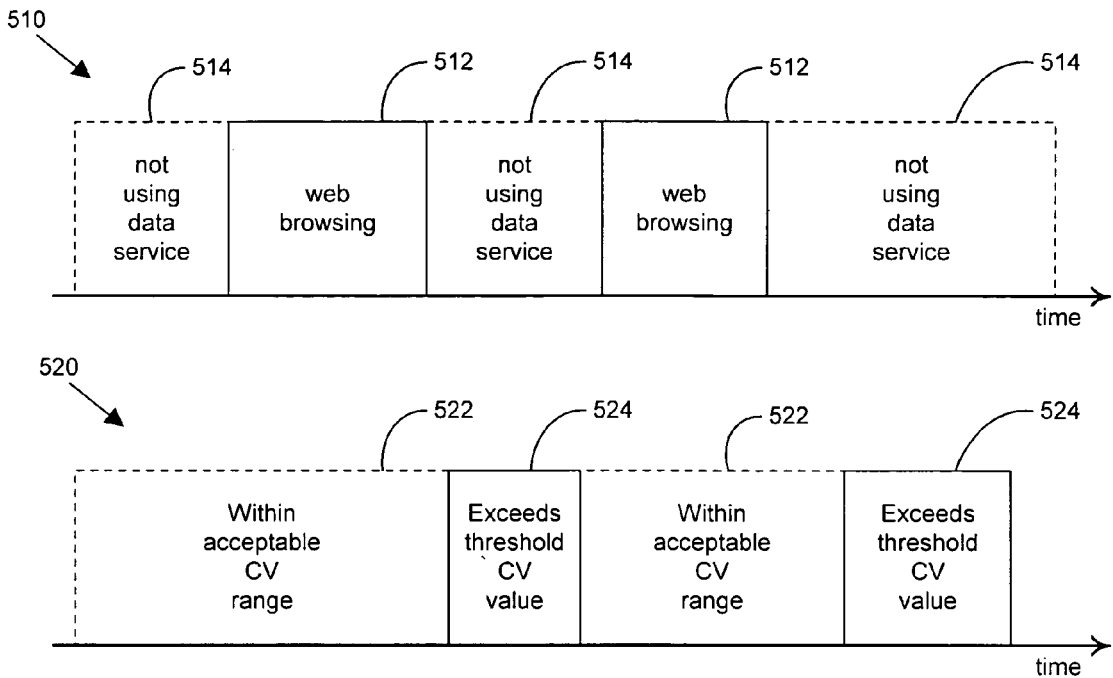
FIGS. 5A and 5B are diagrams illustrating implementations of other methods according to one or more embodiments of the present invention.

In this example, operational data again is collected relating to user data activity (for example, xDSL system use) and CV counts over time. FIG. 5A illustrates a possible relationship of these two types of data over time as used for purposes of this example. Joint estimation of CV and user data activity with an HMM is shown in timeline 520, where the CV counts are in the high state 524 (for example, they exceed zero or some other threshold value) only when the user data activity shown in timeline 510 is likely in its "user not using data service" state 514. In this case, it can be concluded that the electronics device(s) causing impulsive noise is/are turned on only when the user is not using the xDSL service in state 512, so that the CV state 522 is acceptable. Therefore, a controller such as a DSL optimizer might consider setting FEC coding parameters to a lower or minimum protection level because the known impulse noise is unlikely to interference with data service usage.

EXAMPLE 3

Figure 5B:
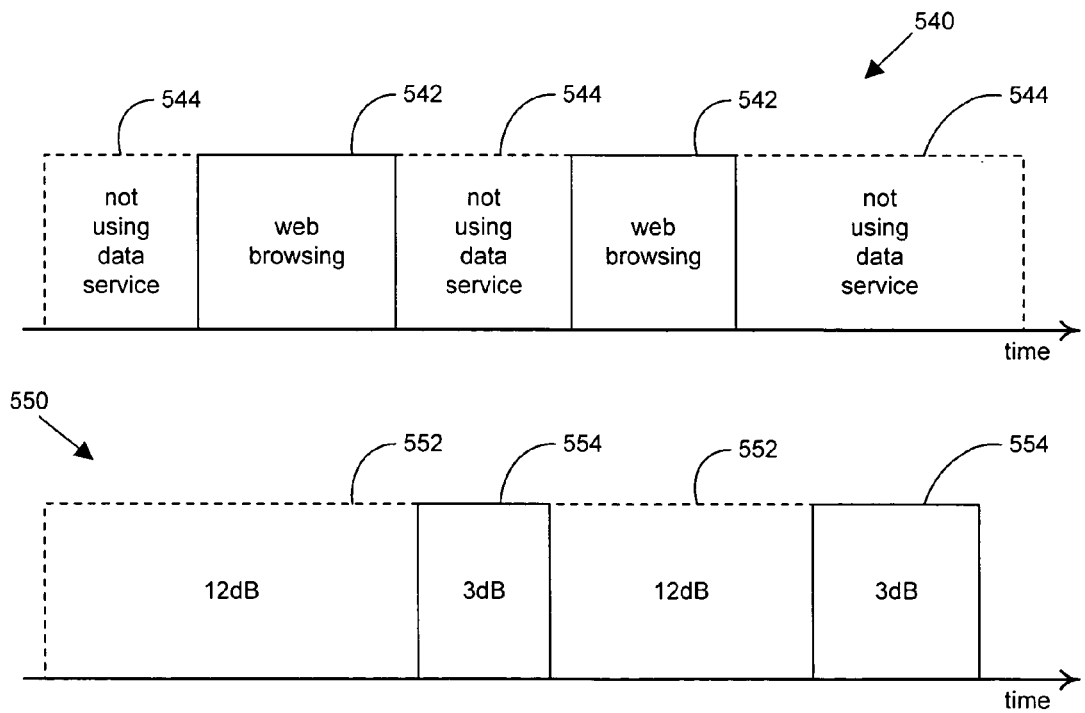

In a variation of Example 2 and FIG. 5A, and as illustrated in FIG. 5B, "acceptable CV," "excessive CV," "high FEC protection" and "low FEC protection" can be replaced with "large noise margin" and "small noise margin" (shown in timeline 550), as they relate to timeline 540. In this case, the user's data rate can be set at 1.5 Mbps because stable service (margin=12 dB≧6 dB, as in state 552) is guaranteed when the user data-activity is in "web browsing" state 542. When the margin is too low (for example, 3 db in state 554), there is little risk to the user because the user data-activity state is in its "not using data service" state 544.

EXAMPLE 4

In this example, the use of HMM together with time information is considered. When the entire HMM model $\lambda=(A, B, \pi)$ is dependent on time (for example, where a user is likely to have data activity between 7 pm and 10 pm), such information can be extracted by modeling λ as function of time index t. Then, the HMM becomes λ(t). Examples of such timeline HMMs can be found, for instance, in "Time-line Hidden Markov Experts and its Application in Time Series Prediction," X. Wang, P. Whigham, D. Deng and M. Purvis, Neural Information Processing—Letters and Reviews, Vol. 3, No. 2, May 2004.

Figure 4:
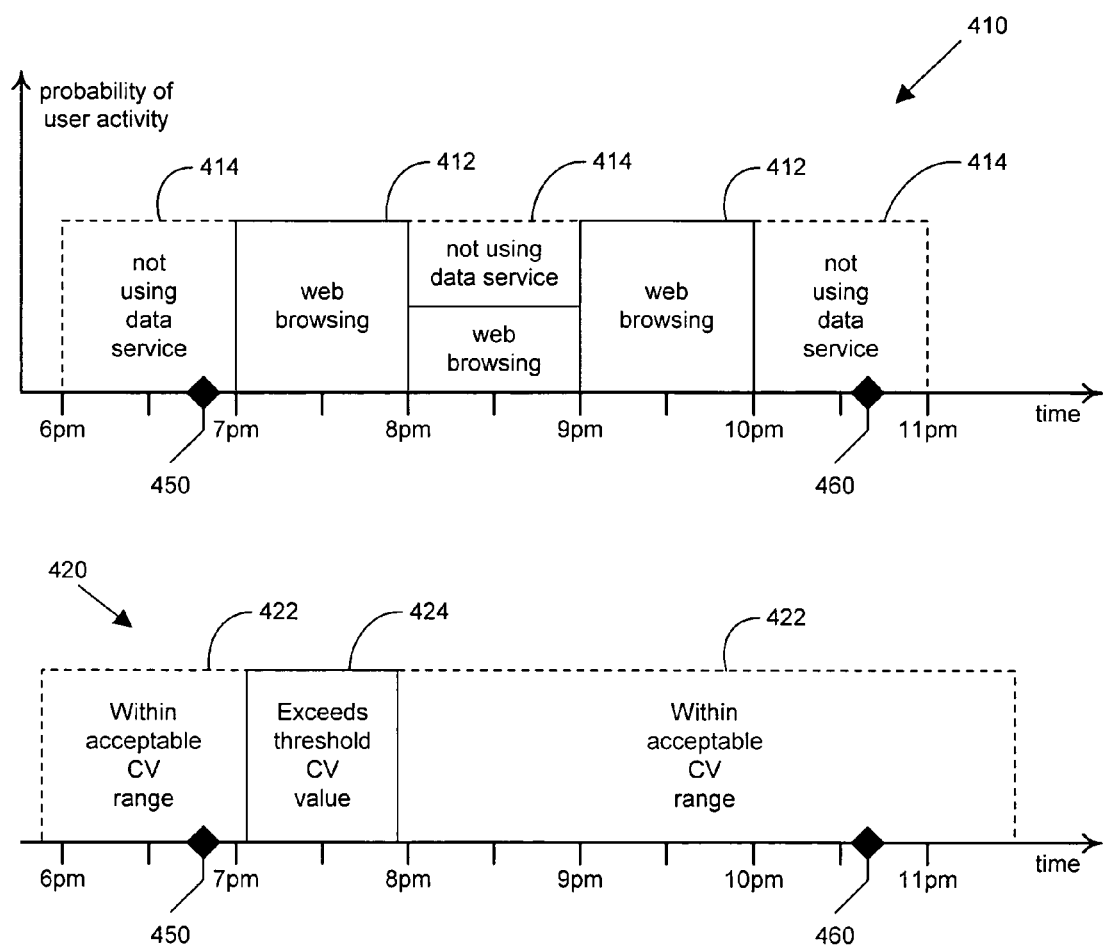
FIG. 4 is a diagram of a method per one embodiment of the present invention.

FIG. 4 compares the data regarding a user data activity state and a performance parameter state (in this case pertaining to CV counts). As shown in FIG. 4, lower timeline 420 shows that CV counts are high at 424, only between 7 pm and 8 pm.

At other times, at 422, the CV counts are within an acceptable range (for example, zero or below a threshold value). As seen in the upper timeline 410 of FIG. 4, user data-activity is definitely (that is, with very high probability) in its "user not using data service" state 414 between 6 pm and 7 pm and between 10 pm and 11 pm. Between 7 pm and 8 pm and 9 pm and 10 pm, there is a high probability of the user data activity being in its "user web browsing" state 412. Moreover, there is a non-negligible probability between 8 pm and 9 pm that the user might be using the data service (timeline 410 shows that there the probabilities of use and non-use are about equal between 8 pm and 9 pm).

Therefore, based on this modeling, the user modem then can be retrained at point 450, between 6 pm and 7 pm, so that FEC coding parameters are set to a high level of protection against impulsive noise (for the upcoming noisy period between 7 pm and 8 pm), and then retrained again at point 460, between 10 pm and 11 pm, so that FEC coding parameters can be set to a low level of protection against impulsive noise. The data rate in the low-protection mode thus can be increased without fear of the negative effects of predictable high impulse noise.

Time dependent HMMs can be used for spectrum and power management also. For instance, transmit power and bit allocation can be set so that the DSL system is ready for the abrupt change in line conditions when the state is moved to the next expected HMM state. For ADSL2 and VDSL2, the power management transition can be changed as a function of the expected next state. That is, if the next state is likely to have data activity, then the DSL's transmit power can be moved from low-power sleep-mode to full power transmission mode at a proper time before the state is changed. In this way, the user will not need to experience any delay for the modem to recover to the full throughput mode.

EXAMPLE 5

In this example, an estimation of hidden CV states shows that the HMM of a communication line has only two states. In the first state, there is no impulsive noise at all and in the second state there is impulse noise that has sufficiently high power that throughput and/or stability cannot be improved using any available level of FEC protection. In this case, FEC should be set to the minimum level because the high protection setting will have no effect on improving performance and is thus useless.

EXAMPLE 6

In this example, an estimation of maximum attainable data rate state shows that the maximum attainable data rate is either "1.5 Mbps" or "0 Mbps" and thus there are only two states. A controller such as a DSL optimizer then can set the line data rate at 1.5 Mbps rather than 192 Kbps (where, for purposes of this example, 192 Kbps is the minimum data rate setting), because the line will not support data service when the maximum attainable data rate is 0 Mbps anyway. By setting the line data rate at 1.5 Mbps, the line will support 1.5 Mbps, rather than 192 Kbps, whenever maximum attainable data rate is not 0 Mbps.

EXAMPLE 7

In this example (which also conforms generally to the methodology of FIG. 3), the collected operational data are bit tables (also known as bit distributions) of a DSL system using DMT modulation. Such bit distributions are collected multiple times over a period of time, and consequently they are analyzed. An HMM model is then constructed (or an existing one is modified), where the hidden states of the model correspond for example to the presence or the absence of a certain strong disturber. Observed bit distributions can then be used to determine whether a strong disturber is present or not. Based on this determination, certain configuration parameters of the DSL system may be set. For example, the maximum number of bits as a function of the tone (BCAP[n]) may be reset to reflect whether a strong disturber is likely to be present.

EXAMPLE 8

Another example assumes that an HMM model must be selected among a set of multiple candidate HMM models. Such candidate HMM models may have been previously constructed using operational data collected over a single line or a set of lines. In some embodiments, each candidate HMM model may be considered characteristic of a dominant effect for DSL transmission (for example, a first HMM model may be used when a bad splice is present or a micro-filter is missing, a second HMM model may be used when a bridged tap is present close to the CPE location, and a third HMM model may be used when the loop appears to be in good condition). The methodology can then choose one of the candidate HMM models, after which the chosen model is used for identifying the hidden state and for accordingly setting one or more configuration parameters of the line.

This methodology can be viewed as being related to the algorithm area variously known as "non-supervised learning" or "clustering" or "vector quantization" (though none of these fields has been applied in a manner similar to that used in connection with embodiments of the present invention). The exemplary methodology presented herein is based on the "Generalized Lloyd's Algorithm."

The methodology consists of a training stage and a classification stage. Let x be the vector of observed data of a modem (for example, pilot tone location, power backoff capability, etc.). Let $y_i$, i=1, . . . ,C be model vectors associated with C clusters, where each cluster (that is, model vector $y_i$) corresponds to a distinct HMM.

The classification stage of the methodology performs the step of finding the cluster/model i for which $d(x, y_i) \leq d(x, y_j)$ for any j other than i, where d is some appropriate distance measure.

The training stage of the methodology involves the following steps:
  i. Initialize vectors $y_i$, i=1, . . . ,C.
  ii. Perform one or more iterations to obtain new model vectors $y_i$, i=1, . . . ,C based on a training set of data.
  iii. Compute the total distortion for the training set of data.
  iv. If the total distortion is smaller than some threshold, then exit; otherwise, go to step ii.

Steps ii and iii are now described in more detail.

For Step ii:
  a) For each vector x belonging to the training set, find the cluster/model i for which $d(x, y_i) \leq d(x, y_j)$ for any j other than i.
  b) For each cluster, recompute $y_i$ as the mean of all vectors x of the training set that also belong to cluster/model i. "Mean" is defined here to be any appropriate averaging operation, as will be appreciated by those skilled in the art.

For Step iii:
  a) Compute total distortion as $D=\text{average}[d(x, y_i)|d(x, y_i) \leq d(x, y_j), j \neq i]$. In other words, it is the average distance of each vector of the training set of data from the closest $y_i$ vector.
  b) By using the above classification stage methodology, vector x of observed data can be classified into one of C clusters, where each cluster is related to one or more specific loop characteristics (for example, a specific HMM).

Figure 6:
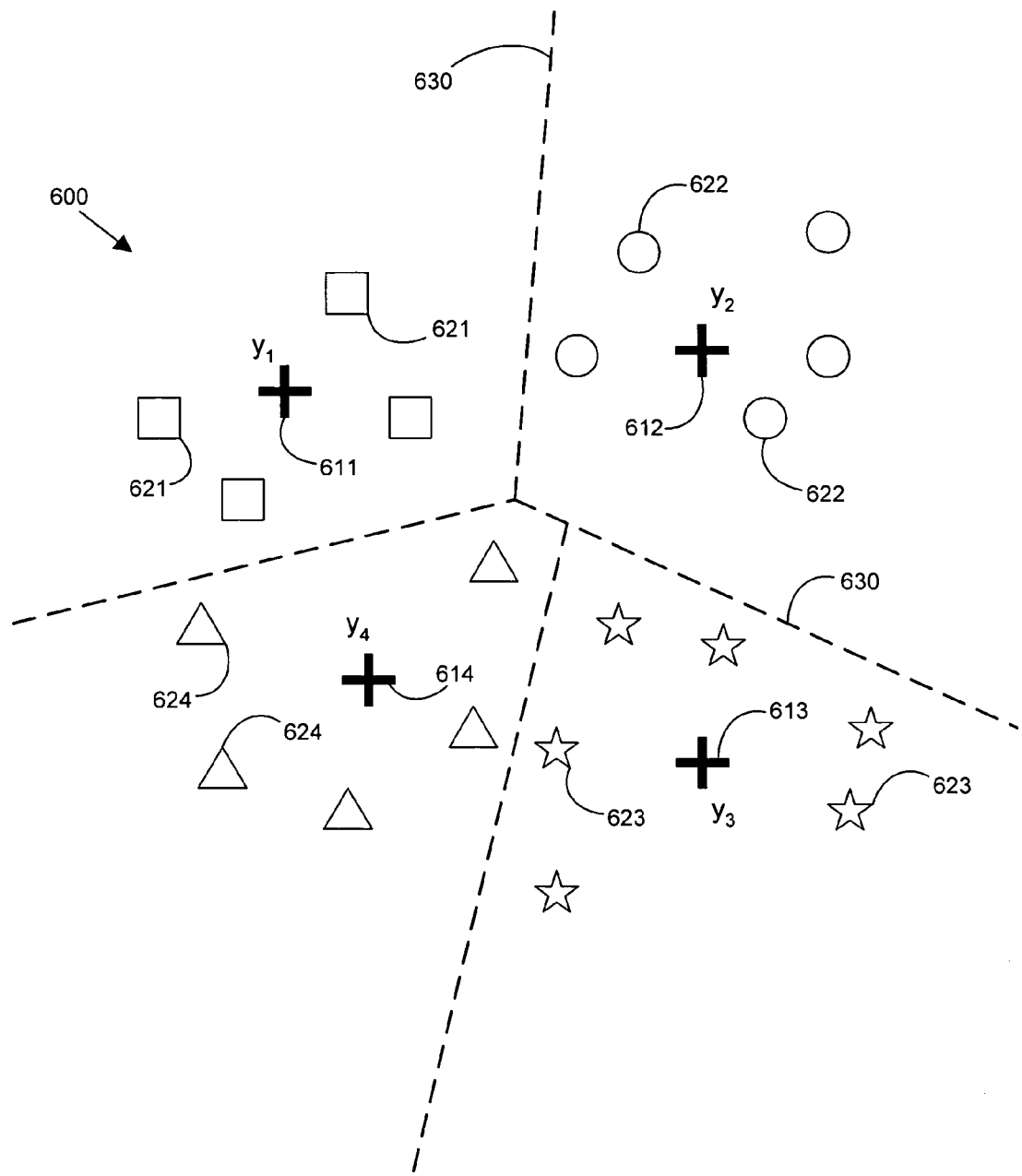
FIG. 6 is a diagram of another method according to one embodiment of the present invention.

FIG. 6 illustrates one embodiment of the present invention implementing Example 8 and using clusters for the case of 4 clusters or loop models based on HMMs. Each cross 611, 612, 613, 614 corresponds to a vector $y_i$ (one for each HMM state). The classification of observed data vectors into clusters also is shown, where observed data vectors classified into the same cluster are shown as squares 621, circles 622, stars 623 and triangles 624 bounded by the lines 630 of the FIG. 600.

Besides properly controlling line parameters as in the above illustrative examples, the user activity levels and usage patterns that can be obtained by HMMs according to embodiments of the present invention may be incorporated in setting and prioritizing user services, for example based on prices and marketing strategies, that may lead to higher user satisfaction and/or operator profits. For instance, a customer who spends most of time in "user downloading large files" state may be considered as a customer for whom providing higher speed service is desirable. Thus, the HMM modeling of data activity using the present invention may have significant value independent of the performance optimization.

Figure 7A:
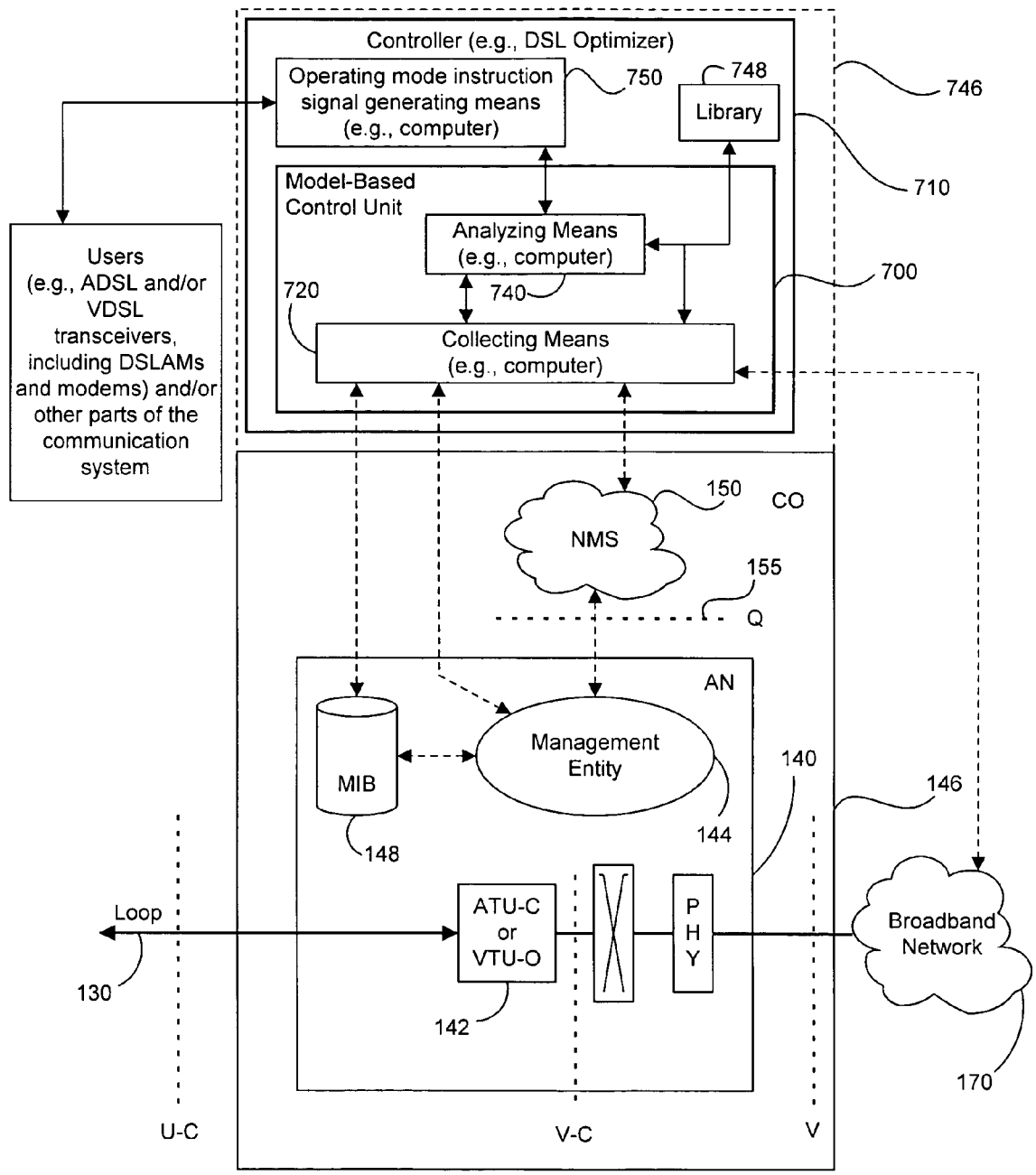
FIG. 7A is a controller including a model-based control unit according to one embodiment of the present invention.

According to one embodiment of the present invention shown in FIG. 7A, a model-based control unit 700 may be part of an independent entity coupled to a DSL system, such as a controller 710 (for example, a device functioning as or with a DSL optimizer, DSM server, DSM Center or a dynamic spectrum manager) assisting users and/or one or more system operators or providers in operating and, perhaps, optimizing use of the system. (A DSL optimizer may also be referred to as a dynamic spectrum manager, Dynamic Spectrum Management Center, DSM Center, System Maintenance Center or SMC.) In some embodiments, the controller 710 may be a completely independent entity, while in other embodiments the controller 710 may be an ILEC or CLEC operating a number of DSL lines from a CO or other location. As seen from the dashed line 746 in FIG. 7A, the controller 710 may be in the CO 146 or may be external and independent of CO 146 and any company operating within the system. Moreover, controller 710 may be coupled to and/or controlling DSL and/or other communication lines in multiple COs.

The model-based control unit 700 includes a data collection unit 720 identified as a collecting means and an analysis unit 740 identified as analyzing means. As seen in FIG. 7A, the collecting means 720 (which can be a computer, processor, IC, computer module, etc. of the type generally known) may be coupled to NMS 150, ME 144 at AN 140 and/or the MIB 148 maintained by ME 144, any or all of which may be part of an ADSL and/or VDSL system for example. Data also may be collected through the broadband network 170 (for example, via the TCP/IP protocol or other protocol or means outside the normal internal data communication within a given DSL system). One or more of these connections allows the model-based control unit 700 to collect operational data from the system and, if appropriate, elsewhere. Data may be collected once or over time. In some cases, the collecting means 720 will collect on a periodic basis, though it also can collect data on-demand or any other non-periodic basis (for example, when a DSLAM or other component sends data to the model-based control unit), thus allowing the model-based control unit 700 to update its information, operation, etc., if desired. Data collected by means 720 is provided to the analyzing means 740 (which also can be a computer, processor, IC, computer module, etc. of the type generally known) for analysis and any decision regarding the construction and/or modification of one or more HMMs to be used in operating one or more communication lines being used to transmit data and/or in the determination of how to configure operation of one or more communication lines in the communication system.

In the exemplary system of FIG. 7A, the analyzing means 740 is coupled to a signal generating means 750 in the controller 710. This signal generator 750 (which can be a computer, processor, IC, computer module, etc.) is configured to generate and send instruction signals to modems and/or other components of the communication system (for example, ADSL and/or VDSL transceivers and/or other equipment, components, etc. in the system). These instructions may include instructions regarding data rates, transmit power levels, coding and latency requirements, retraining scheduling and implementation, system configuration instructions, etc. The instructions may be generated after the controller 710 determines the reliability of any constructed HMMs and the use of those models as a basis for configuring and/or controlling operation of a communication system coupled to the controller 710.

Embodiments of the present invention can utilize a database, library or other collection of data pertaining to the data collected, previously constructed HMMs, etc. This collection of reference data may be stored, for example, as a library 748 in the controller 710 of FIG. 7A and used by the analyzing means 740 and/or collecting means 720.

In some embodiments of the present invention, the model-based control unit 700 may be implemented in one or more computers such as PCs, workstations or the like and/or in one or more computer program products. The collecting means 720 and analyzing means 740 may be software modules, hardware modules or a combination of both, as will be appreciated by those skilled in the art. When working with a large numbers of modems, lines, users, etc., databases may be introduced and used to manage the volume of data collected.

Figure 7B:
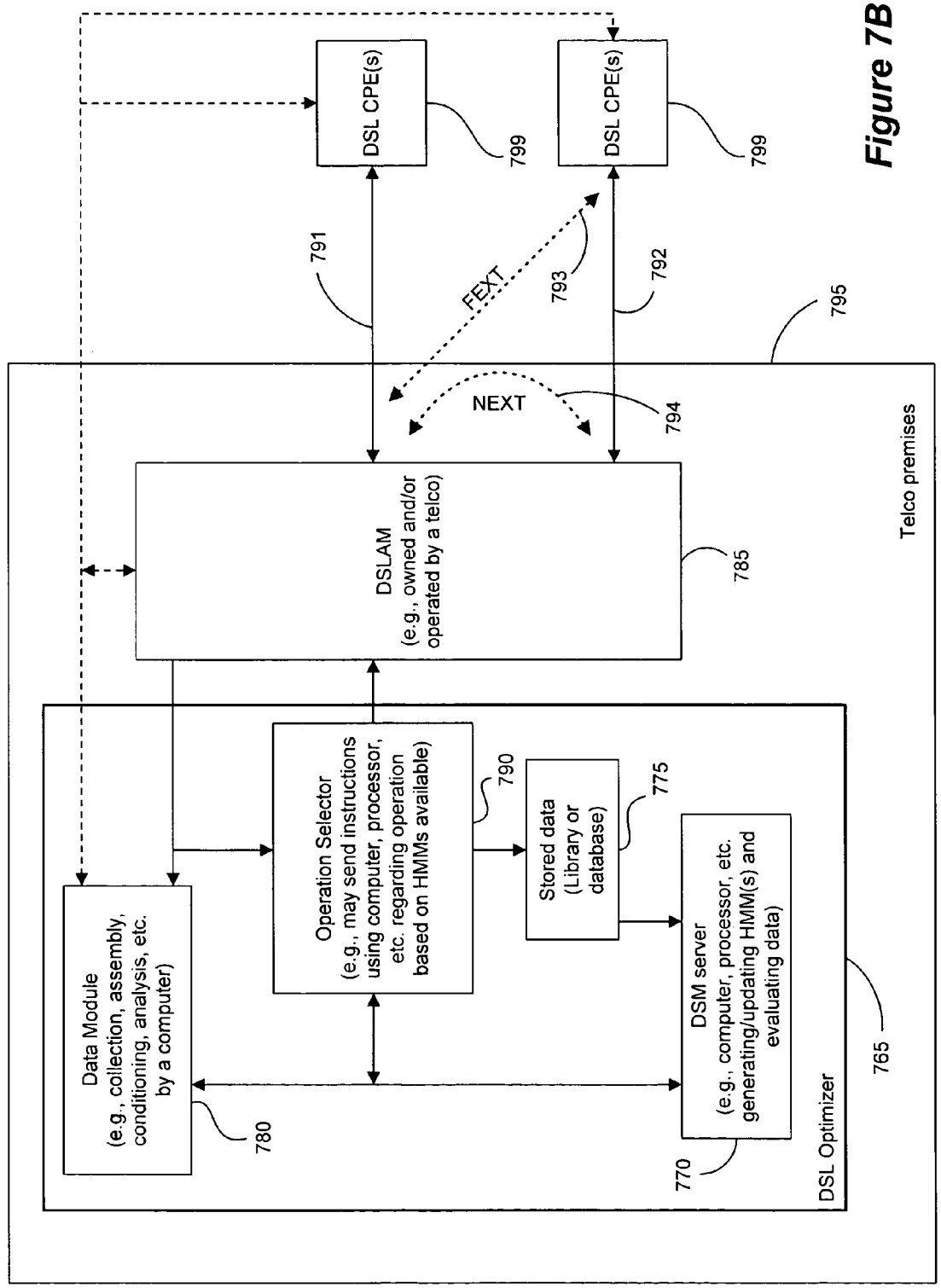
FIG. 7B is the DSL optimizer according to one embodiment of the present invention.

Another embodiment of the present invention is shown in FIG. 7B. A DSL optimizer 765 operates on and/or in connection with a DSLAM 785 or other DSL system component (for example, an RT, ONU/LT, etc.), either or both of which may be on the premises 795 of a telecommunication company (a "telco"). The DSL optimizer 765 includes a data module 780, which can collect, assemble, condition, manipulate and/or supply operational data for and to the DSL optimizer 765. Module 780 can be implemented in one or more computers such as PCs or the like. Data from module 780 is supplied to a DSM server module 770 for analysis (for example, determining the availability and reliability of operational data, construction of HMMs based on collected operational data for given communication lines, control and operational changes to the communication system based on any constructed HMMs, etc.). Information also may be available from a library or database 775 that may be related or unrelated to the telco.

An operation selector 790 may be used to implement signals affecting operation of the communication system. Such decisions may be made by the DSM server 770 or by any other suitable manner, as will be appreciated by those skilled in the art. Operational modes selected by selector 790 are implemented in the DSLAM 785 and/or any other appropriate DSL system component equipment. Such equipment may be coupled to DSL equipment such as customer premises equipment 799. Device 785 can be used to implement any ordered changes based on HMMs considered by the DSL optimizer 765. The system of FIG. 7B can operate in ways analogous to the system of FIG. 7A, as will be appreciated by those skilled in the art, though differences are achievable while still implementing embodiments of the present invention.

Generally, embodiments of the present invention employ various processes involving data stored in or transferred through one or more computer systems, which may be a single computer, multiple computers and/or a combination of computers (any and all of which may be referred to interchangeably herein as a "computer" and/or a "computer system"). Embodiments of the present invention also relate to a hardware device or other apparatus for performing these operations. This apparatus may be specially constructed for the required purposes, or it may be a general-purpose computer and/or computer system selectively activated or reconfigured by a computer program and/or data structure stored in a computer. The processes presented herein are not inherently related to any particular computer or other apparatus. In particular, various general-purpose machines may be used with programs written in accordance with the teachings herein, or it may be more convenient to construct a more specialized apparatus to perform the required method steps. A particular structure for a variety of these machines will be apparent to those of ordinary skill in the art based on the description given below.

Embodiments of the present invention as described above employ various process steps involving data stored in computer systems. These steps are those requiring physical manipulation of physical quantities. Usually, though not necessarily, these quantities take the form of electrical or magnetic signals capable of being stored, transferred, combined, compared and otherwise manipulated. It is sometimes convenient, principally for reasons of common usage, to refer to these signals as bits, bitstreams, data signals, control signals, values, elements, variables, characters, data structures or the like. It should be remembered, however, that all of these and similar terms are to be associated with the appropriate physical quantities and are merely convenient labels applied to these quantities.

Further, the manipulations performed are often referred to in terms such as identifying, fitting or comparing. In any of the operations described herein that form part of the present invention these operations are machine operations. Useful machines for performing the operations of embodiments of the present invention include general purpose digital computers or other similar devices. In all cases, there should be borne in mind the distinction between the method of operations in operating a computer and the method of computation itself. Embodiments of the present invention relate to method steps for operating a computer in processing electrical or other physical signals to generate other desired physical signals.

Embodiments of the present invention also relate to an apparatus for performing these operations. This apparatus may be specially constructed for the required purposes, or it may be a general purpose computer selectively activated or reconfigured by a computer program stored in the computer. The processes presented herein are not inherently related to any particular computer or other apparatus. In particular, various general purpose machines may be used with programs written in accordance with the teachings herein, or it may be more convenient to construct a more specialized apparatus to perform the required method steps. The required structure for a variety of these machines will appear from the description given above.

In addition, embodiments of the present invention further relate to computer readable media that include program instructions for performing various computer-implemented operations. The media and program instructions may be those specially designed and constructed for the purposes of the present invention, or they may be of the kind well known and available to those having skill in the computer software arts. Examples of computer-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Figure 8:
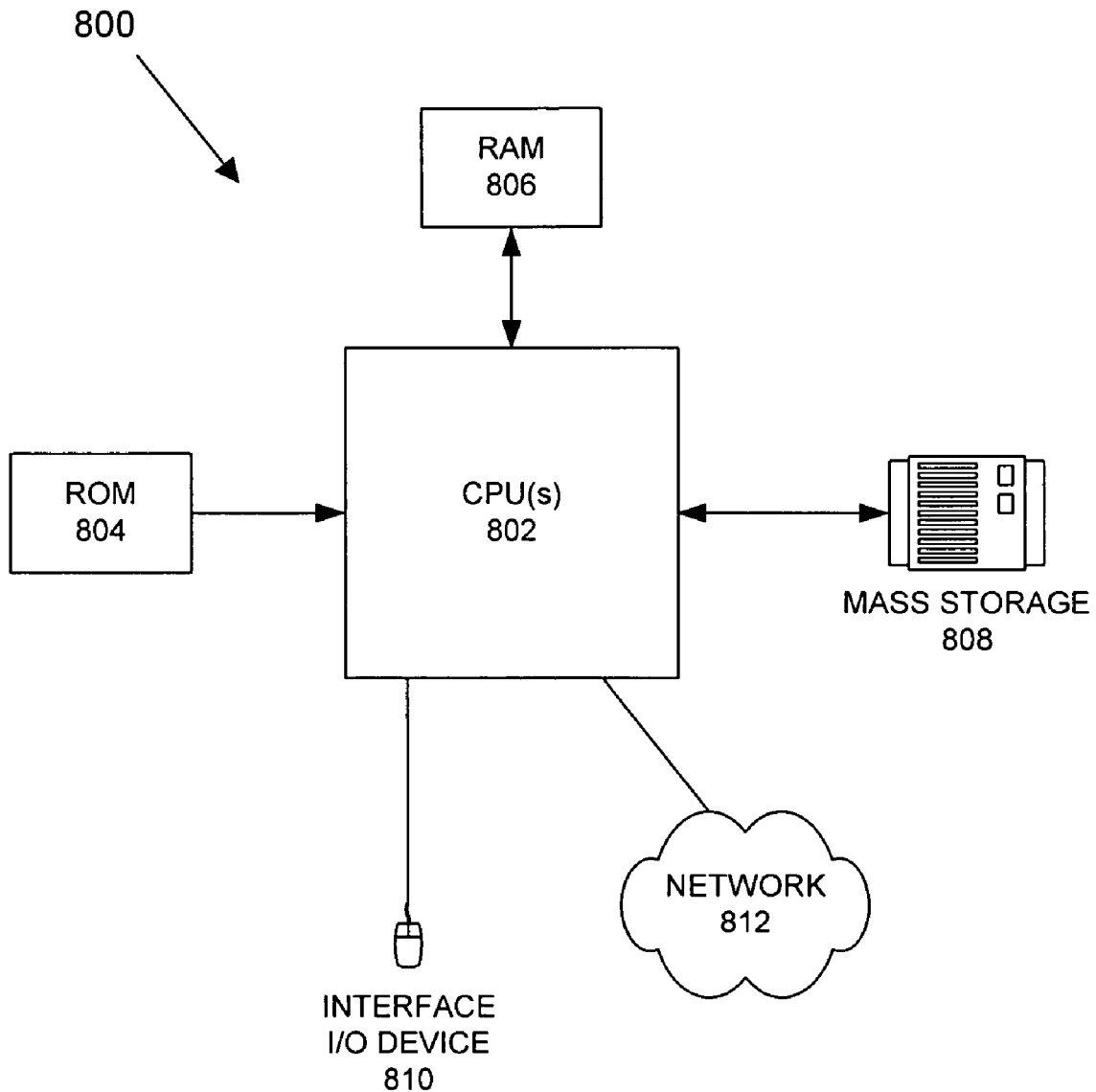
FIG. 8 is a block diagram of a typical computer system or integrated circuit system suitable for implementing embodiments of the present invention.

FIG. 8 illustrates a typical computer system that can be used by a user and/or controller in accordance with one or more embodiments of the present invention. The computer system 800 includes any number of processors 802 (also referred to as central processing units, or CPUs) that are coupled to storage devices including primary storage 806 (typically a random access memory, or RAM), primary storage 804 (typically a read only memory, or ROM). As is well known in the art, primary storage 804 acts to transfer data and instructions uni-directionally to the CPU and primary storage 806 is used typically to transfer data and instructions in a bi-directional manner. Both of these primary storage devices may include any suitable of the computer-readable media described above. A mass storage device 808 also is coupled bi-directionally to CPU 802 and provides additional data storage capacity and may include any of the computer-readable media described above. The mass storage device 808 may be used to store programs, data and the like and is typically a secondary storage medium such as a hard disk that is slower than primary storage. It will be appreciated that the information retained within the mass storage device 808, may, in appropriate cases, be incorporated in standard fashion as part of primary storage 806 as virtual memory. A specific mass storage device such as a CD-ROM 814 may also pass data uni-directionally to the CPU.

CPU 802 also is coupled to an interface 810 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 802 optionally may be coupled to a computer or telecommunications network using a network connection as shown generally at 812. With such a network connection, it is contemplated that the CPU might receive information from the network, or might output information to the network in the course of performing the above-described method steps. The above-described devices and materials will be familiar to those of skill in the computer hardware and software arts. The hardware elements described above may define multiple software modules for performing the operations of this invention. For example, instructions for running a codeword composition controller may be stored on mass storage device 808 or 814 and executed on CPU 802 in conjunction with primary memory 806. In a preferred embodiment, the controller is divided into software submodules.

The many features and advantages of the present invention are apparent from the written description, and thus, the appended claims are intended to cover all such features and advantages of the invention. Further, since numerous modifications and changes will readily occur to those skilled in the art, the present invention is not limited to the exact construction and operation as illustrated and described. Therefore, the described embodiments should be taken as illustrative and not restrictive, and the invention should not be limited to the details given herein but should be defined by the following claims and their full scope of equivalents, whether foreseeable or unforeseeable now or in the future.

What is claimed is:

1. A method of controlling an operational line in a DSL system, the method comprising:
   constructing a Hidden Markov Model (HMM) to model one or more internal states of the DSL system, the states characterizing at least one of data activity, impulse noise, crosstalk, noise margin, maximum attainable data rate or bit distributions;
   collecting update operational data from the operational line;
   analyzing the collected update operational data, the analyzing farther comprising:
      estimating an observation probability, a state-transition probability matrix, and an initial state distribution of the HMM based on the collected update operational data;
      estimating a likelihood of at least one state of the HMM based on the collected update operational data; and
   controlling operation of the DSL system based on the constructed HMM and analyzed update operational data, the controlling further comprising:
      determining control parameters based on the estimated likelihood of at least one state of the HMM; and
      modifying operation of the operational line through application of the determined control parameters to reflect the information available from the HMM.

2. The method of claim 1
   wherein the HMM is constructed to model one or more internal states characterizing at least data activity;
   wherein the observation probability, the state-transition probability matrix, and the initial state distribution of the HMM are estimated with the Baum-Welch algorithm;
   wherein the likelihood of at least one state of the HMM is estimated with the Viterbi algorithm; and
   wherein the control parameters are determined based on the estimated likelihood of at least one state of the HMM only for those states with data activity.

3. The method of claim 1 wherein constructing an HMM to model the internal states of a DSL system comprises:
   collecting training operational data from the operational line; and
   analyzing the collected training operational data to construct the HMM.

4. The method of claim 3 wherein analyzing the collected training operational data comprises using the Baum-Welch algorithm.

5. The method of claim 3 wherein at least one of the collected training operational data or the collected update operational data is checked for compliance with at least one of the following:
   a data timeliness rule; or
   a data sufficiency rule.

6. The method of claim 1 further comprising updating the HMM based on the collected update operational data.

7. The method of claim 1 wherein controlling operation of the DSL system based on the constructed HMM and analyzed update operational data comprises at least one of the following:
   determining the internal state of the DSL system; or
   controlling at least one of the following parameters of the operational line:
      data rate;
      target SNR margin (TSNRM);
      maximum SNR margin (MAXSNRM);
      minimum SNR margin (MINSNRM);
      FEC parameters;
      an FEC delay parameter;
      an FEC INP parameter;
      transmit power;
      a carrier mask parameter;
      a power spectral density parameter;
      a bit loading parameter;
      bit allocation;
      PSDMASK;
      CARMASK; or
      BCAP.

8. The method of claim 1 wherein controlling operation of the DSL system based on the constructed HMM and analyzed update operational data comprises forcing a retrain of the operational line.

9. The method of claim 8 wherein forcing a retrain of the operational line is scheduled to occur when at least one of the following conditions is satisfied:
   at a predetermined time;
   when user data activity is detected to be below a certain threshold.

10. The method of claim 1 wherein constructing the HMM comprises choosing one HMM from a plurality of candidate HMMs, each candidate HMM corresponding to a characteristic line state.

11. A computer program product comprising:
   a machine readable medium; and
   program instructions contained in the machine readable medium, the program instructions specifying a method of controlling operation of an operational line in a DSL system, the method comprising;
   constructing a Hidden Markov Model (HMM) to model the internal states of the DSL system, the states characterizing at least one of data activity, impulse noise, crosstalk, noise margin, maximum attainable data rate or bit distributions;
   collecting update operational data from the operational line;
   analyzing the collected update operational data, the analyzing further comprising:
      estimating an observation probability, a state-transition probability matrix, and an initial state distribution of the HMM based on the collected update operational data;
      estimating a likelihood of at least one state of the HMM based on the collected update operational data; and
   controlling operation of the DSL system based on the constructed HMM and analyzed operational data, the controlling further comprising:
   determining control parameters based on the estimated likelihood of at least one state of the HMM; and
   modifying operation of the operational line through application of the determined control parameters to reflect the information available from the HMM.

12. A device for controlling operation of an operational line in a DSL system, the device comprising:
- means for collecting operational data from the operational line;
- means coupled to the collecting means for analyzing the collected operational data, the analyzing means further comprising:
  - means for estimating the observation probability, the state-transition probability matrix, and the initial state distribution of a Hidden Markov Model (HMM) based on the collected update operational data;
  - means for estimating a likelihood of at least one state of the HMM based on the collected update operational data;
- means for controlling operation of the operational line based on:
  - the collected operational data; and
  - the HMM modeling the internal states of the DSL system, the states characterizing at least one of data activity, impulse noise, crosstalk, noise margin, maximum attainable data rate or bit distributions.

13. The device of claim 12 wherein the HMM modeling the internal states of the DSL system pertains to modeling at least one of the following:
- channel characteristics;
- non-impulse noise characteristics; or
- user data activity.

14. The device of claim 12 wherein the device is configured to construct and update the HMM by:
- using the collecting means to collect operational data from the operational line; and
- using the analyzing means to analyze the collected operational data.

15. The device of claim 12 wherein the device updates the HMM as necessary based on the collected operational data.

16. The device of claim 12 wherein the collecting means is configured to check for compliance with at least one of the following:
- a data timeliness rule; or
- a data sufficiency rule.

17. The device of claim 12 further wherein means for controlling operation of the operational line controls at least one of the following parameters:
- data rate;
- target SNR margin (TSNRM);
- maximum SNR margin (MAXSNRM);
- minimum SNR margin (MINSNRM);
- FEC parameters;
- an FEC delay parameter;
- an FEC INP parameter;
- transmit power;
- a carrier mask parameter;
- a power spectral density parameter;
- a bit loading parameter;
- bit allocation;
- PSDMASK;
- CARMASK; or
- BCAP.

18. The device of claim 12 further wherein means for controlling operation of the operational line forces a retrain of the operational line.

19. The device of claim 18 wherein forcing a retrain of the operational line is scheduled to occur when at least one of the following conditions is satisfied:
- at a predetermined time;
- when user data activity is detected to be below a certain threshold.

20. The device of claim 18 wherein the HMM modeling the internal states of the DSL system is chosen from a plurality of candidate HMMs.

21. The method of claim 1 wherein the HMM model is dependent on time and the states are modeled as a function of a time index;
- wherein the collected operational data pertains to data activity and CV counts over time; and
- wherein a forward error correction (FEC) parameter is determined as a function of the time index.

22. The method of claim 1, wherein the collected operational data comprise bit distributions, wherein the internal states of the model correspond to the presence or absence of at least one disturber, and wherein the determined control parameters comprise BCAP.

* * * * *